United States Patent
Beiersdorf et al.

(12) 
(10) Patent No.: US 6,440,231 B1
(45) Date of Patent: Aug. 27, 2002

(54) PROCESS FOR THE COLLECTIVE PRETREATMENT OF STEEL, GALVANIZED STEEL, MAGNESIUM AND ALUMINUM BEFORE BONDING TO RUBBER

(75) Inventors: Wolf-Dieter Beiersdorf, Duesseldorf; Werner Gruber, Korschenbroich; Hans Scheer; Juergen Foell, both of Duesseldorf; Birgit Gies, Langenfeld; Peter Kuhm, Hilden; Franz-Josef Schueller, Monheim, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 08/676,333

(22) PCT Filed: Jan. 11, 1995

(86) PCT No.: PCT/EP95/00090

§ 371 (c)(1),
(2), (4) Date: Jul. 19, 1996

(87) PCT Pub. No.: WO95/20061

PCT Pub. Date: Jul. 27, 1995

(30) Foreign Application Priority Data

Jan. 20, 1994 (DE) .......................................... 44 01 566

(51) Int. Cl.⁷ .............................................. C23C 22/07
(52) U.S. Cl. ...................................... 148/261; 148/253
(58) Field of Search ................................. 148/253, 261

(56) References Cited

U.S. PATENT DOCUMENTS

| 2,774,701 A | | 12/1956 | Koryta ........................ 154/130 |
| 2,839,439 A | * | 6/1958 | Stapleton .................... 148/261 |
| 3,697,332 A | | 10/1972 | Kuehner ..................... 148/6.15 |
| 3,996,074 A | | 12/1976 | Rakestraw et al. ......... 148/6.16 |
| 4,017,335 A | | 4/1977 | Maloney .................... 148/6.15 |
| 4,740,389 A | * | 4/1988 | Barton et al. ............. 427/207.1 |
| 4,838,957 A | * | 6/1989 | Miyamoto .................. 148/253 |
| 5,143,562 A | | 9/1992 | Boulos ........................ 148/247 |

FOREIGN PATENT DOCUMENTS

| DE | 26 38 723 | | 3/1977 | |
| FR | 1007909 | | 5/1952 | |
| JP | 0097639 | * | 8/1977 | |
| JP | 5230669 | * | 9/1993 | ................. 148/253 |

OTHER PUBLICATIONS

WO 9610094 9/90.*
Physical Metallurgy Priciples, Second Edition, Robert E. Reed–Hill p. 327, Dec. 1973.*
Durability of Rubber–Metal Bonds in Corrosive Environments, Int. Polym Sci. Technol. 19, (9), T/19–T/28 (1992).
WäBrige Gummi–Metall–Haftmittel als Alternative zu lösemittelhaltigen Systemen (Water–Based Rubber–Metal Adhesives as an Alternative to Solvent–Containing Systems) Kautschuk +Gummi Kunstst. 44 (7), 674–678 (1991).

* cited by examiner

Primary Examiner—Scott Kastler
(74) Attorney, Agent, or Firm—Stephen D. Harper; Daniel S. Ortiz

(57) ABSTRACT

A process for the production of a rubber-to-metal bond on steel, galvanized steel, aluminum and/or magnesium is provided The process comprises at least the following steps:

a) chemical pretreatment of the metal parts, b) intermediate rinsing, and c) vulcanizing-on of natural or synthetic rubber using primers and/or binders.

The chemical pretreatment in step a) is carried out with an aqueous solution with a pH value of 3.5 to 5.5 which contains:

4 to 20 g/l of phosphate ions, 0.1 to 1 g/l of free or complexed fluoride, and 0.04 to 1 g/l of nitrate ions.

22 Claims, No Drawings

PROCESS FOR THE COLLECTIVE PRETREATMENT OF STEEL, GALVANIZED STEEL, MAGNESIUM AND ALUMINUM BEFORE BONDING TO RUBBER

This invention relates to a process for the pretreatment of metal surfaces before bonding to rubber, by which both steel, galvanized steel and also aluminum and magnesium can be treated individually or in combination with one another. The process does not require any solvents and does not involve the use of chromium compounds either in the process itself or in any post-rinse steps.

The process is particularly suitable for producing rubber-to-metal bonds where the unvulcanized rubber mastic is applied to the metal and is vulcanized in contact with the metal surface, generally using vulcanization aids.

DISCUSSION OF RELATED ART

Before the rubber-to-metal bond is established, the metal surfaces have to be cleaned and then brought into a state suitable for adequate adhesion. Blasting processes, for example, are suitable for this purpose. Unfortunately, they are attended by the disadvantage that, in many cases, the corrosion resistance of the rubber-to-metal bond is inadequate. In addition, the blasted parts require rapid further treatment. The considerable waste which accumulates during blasting leads to disposal problems. Accordingly, it is standard practice to subject the metal surfaces to a chemical pretreatment which reduces their susceptibility to corrosion and, at the same time, improves the ability of the rubber to adhere to the metal.

A review of standard chemical pretreatment processes can be found in the article by S. Lizumi ("Durability of Rubber-Metal Bonds in Corrosive Environments", Int. Polym. Sci. Technol. 19 (9), T/19–T/28 (1992)). Zinc or iron phosphating are mentioned as chemical pretreatment processes for iron-containing materials while yellow or green chromating is mentioned for aluminum. There is no reference to a process which is suitable both for aluminum and for steel. The chromating of aluminum and the zinc or iron phosphating of steel are widely used methods for pretreating the metal surfaces which are used not only to establish rubber-to-metal bonds, but also to a far larger extent as a pretreatment before painting.

The corrosion-inhibiting properties of a phosphate coating are generally further improved by a passivating after-rinse, often with chromium-containing solutions. For example, DE-A-26 38 723 describes a process for improving the hydrolysis resistance of the bond between a steel alloy and rubber products which comprises inter alia the steps of applying a crystalline zinc phosphate coating and post-rinsing of the zinc phosphate coating with a solution of chromic acid.

The problem addressed in U.S. Pat. No. 5,143,562 was to provide a corrosion-inhibiting treatment process by which different metal surfaces, for example steel and aluminum, could be treated at the same time. This process is based on iron phosphating and uses aqueous solutions which may contain the following components: phosphate ions, complex and simple fluorides, iron complexing agents, hydroxylamine as a phosphating accelerator, oxidizing agents, for example aromatic nitro compounds or molybdates, surfactants, foam inhibitors and also hydrotropes for improving the solubility of these components. According to the statement of problem, this process is used to obtain permanent protection of the metal surface against corrosion and, more particularly, as a pretreatment before subsequent painting. There is nothing to indicate whether the process is suitable for the production of rubber-to-metal bonds.

Testing of the suitability of pretreatment processes for the production of rubber-to-metal bonds requires methods by which the strength of the bonds can be determined, particularly after exposure to corrosive influences. A summary of such methods can be found, for example, in the article by D. Beiersdorf and H. Scheer entitled"WäBrige Gummi-Metall-Haftmittel als Alternative zu lösemittelhaltigen Systemen (Water-Based Rubber-Metal Adhesives as an Alternative to Solvent-Containing Systems)", Kaut-schuk+Gummi Kunstst 44 (7), 674–678 (1991). For example, the methods known to the expert as standard tests for tensile shear strength, peel strength and resistance to boiling water are explained in this literature reference.

The problem addressed by the present invention was to provide a process which would improve the strength and corrosion resistance of rubber-to-metal bonds and which could be applied to steel, galvanized steel, aluminum and magnesium either individually or in combination with one another.

SUMMARY OF THE INVENTION

The problem stated above has been solved by a process for the production of a rubber-to-metal bond on steel, galvanized steel, aluminum and/or magnesium, comprising at least the following steps:

a) chemical pretreatment of the metal parts, b) intermediate rinsing, c) vulcanizing-on of natural or synthetic rubber using primers and/or binders, characterized in that the chemical pretreatment in step a) is carried out with an aqueous solution with a pH value of 3.5 to 5.5 which contains 4 to 20 g/l of phosphate ions, 0.1 to 1 g/l of free or complexed fluoride and 0.04 to 1 g/l of nitrate ions.

DETAILED DESCRIPTION OF THE INVENTION

The anions mentioned may be used in the form of the free acids or in the form of water-soluble salts. Suitable water-soluble salts are the alkali metal and ammonium salts, preferably sodium salts. The pH value has to be increased or reduced to the range according to the invention, depending on whether the anions are used as acids or as salts. If it has to be increased, the pH value is preferably adjusted with alkali metal hydroxide, more especially sodium hydroxide. If it has to be reduced, the pH value is preferably adjusted with an acid which forms the anions mentioned, more especially phosphoric acid. Under the pH conditions and at the concentrations according to the invention, the phosphate ions are mainly present in the form of the dihydrogen phosphate ions and the monohydrogen phosphate ions.

The necessary fluoride may be present in free or in complexed form. Fluoride contents in the upper concentration range are advisable when the baths have built up an aluminum content of 3 to 10 ppm through erosion. Higher Al contents lead to a reduction in the performance of the treatment baths. The freed flouride source is selected in particular from hydrofluoric acid, ammonium fluoride and alkali metal fluorides. Complex fluoride may advantageously be used in the form of the fluorocomplexes of silicon, titanium and zirconium. It is particularly preferred to use potassium hexafluorotitanate. The bath solution may also contain free and complexed fluoride alongside one another providing the total fluoride concentration does not exceed 1 g/l. Higher fluoride contents adversely affect layer formation on Al.

The corrosion prevention and adhesion values obtainable by pretreatment of the metal parts in accordance with the invention can be further improved by adding molybdate ions to the treatment solution in quantities of 0.05 to 0.5 g/l. Ammonium and alkaline earth metal molybdates are particularly suitable sources for these ions, sodium molybdate preferably being used.

In order to improve the wetting of the metal parts with the pretreatment solution, it is advisable to add nonionic surfactants to the solution in quantities of 0.5 to 2 g/l. The nonionic surfactants are preferably selected from the group of ethoxylation and/or ethoxylation/propoxylation products of fatty alcohols containing 10 to 18 carbon atoms. Suitable examples of such nonionic surfactants are adducts of 6 moles of ethylene oxide and 8 moles of propylene oxide with a fatty alcohol containing 10 to 12 carbon atoms, adducts of 5 moles of ethylene oxide and 4 moles of propylene oxide with a fatty alcohol containing 12 to 14 carbon atoms and adducts of 8 moles of ethylene oxide with fatty alcohols containing 12 to 15 carbon atoms. For application by spraying where excessive foaming of the treatment solution has to be prevented, it is advisable at least partly to use those nonionic surfactants which are end-capped, i.e. which are present as ethers. One example of such nonionic surfactants are butyl-end-capped adducts of 9 moles of ethylene oxide with fatty alcohols containing 12 to 18 carbon atoms.

The pretreatment of the metal parts in accordance with the invention may be carried out by immersion or spraying. In general, immersion processes require longer treatment times and higher bath temperatures than spray processes. For example, pretreatment may be carried out by immersing the metal parts in the treatment solution for 2 to 8 minutes, the treatment solution preferably having a temperature of 40 to 60° C. Alternatively, the pretreatment may be carried out by spraying the metal parts with the treatment solution for 1 to 3 minutes, the treatment solution preferably having a temperature of 30 to 50° C.

In another embodiment, the present invention relates to the use of aqueous solutions with a pH value of 3.5 to 5.5 which contain 4 to 20 g/l of phosphate ions,
0.1 to 1 g/l of free or complexed fluoride and
0.04 to 1 g/l of nitrate ions
and preferably
0.05 to 0.5 g/l of molybdate ions
and/or
0.5 to 2 g/l of nonionic surfactants
to increase the adhesive strength of a rubber-to-metal bond on steel, galvanized steel, aluminum and/or magnesium. These solutions may be applied as described in the foregoing.

The process steps according to the invention form part of a treatment chain. This treatment chain may include the cleaning/degreasing of the metal parts before their chemical pretreatment in accordance with the invention. If the process according to the invention is carried out with a surfactant-containing aqueous solution, there may be no need for a separate cleaning/degreasing step if the metal parts are not too heavily soiled or covered with oil. However, if the metal parts are covered with particularly obstinate soils or if it is desired to carry out the process according to the invention with a surfactant-free solution, it is advisable to subject the metal parts to a separate cleaning/degreasing step beforehand. This may be done with conventional, preferably alkaline, cleaners. pH values of 10 to 11 are recommended for aluminum, magnesium and galvanized steel while a pH value of 11 to 13 is recommended for steel.

An intermediate rinse is carried out between the pretreatment and application of the primer. Deionized water is preferably used for this purpose. In order further to improve the corrosion resistance of the rubber-to-metal bond, this rinse may be followed by a passivating after-rinse. The same after-rinse solutions used in the prior art for the after-passivation of iron or zinc phosphate conversion coatings may be used for this purpose. For example, chromium-containing after-rinse solutions may be used. However, for reasons of works safety and pollution control and also for reasons of disposal, there is a tendency to replace these chromium-containing passivating baths by chromium-free treatment baths. Purely inorganic bath solutions, more especially based on titanium and/or zirconium compounds, or even organic reactive bath solutions, for example based on polyvinyl phenols, are known for this purpose. Following the after-passivation step, another rinse with deionized water is recommended. Thereafter, the pretreated metal parts may be directly further processed or, if desired, may even be dried and temporarily stored.

EXAMPLES

Testing of the process according to the invention was carrie[0084] out with test specimens of steel, (ST37), aluminum (AlMgSi1 F32) and electrolytically galvanized steel (EG). After the pretreatment, the tests specimens were coated with a primer containing chlorinated rubber (Chemosil® 211, Henkel KGaA) and with a dinitrosobenzene-based binder (Chemosil® 222, Henkel KGaA) for vulcanization with natural or synthetic rubber. A natural rubber (elastomer 1), a styrene/butadiene rubber mixture (elastomer 2) and EPDM (ethylenelpropylene/diene rubber, elastomer 3) were tested as characteristic elastomers. Depending on the type of elastomer, the bonds were cured by vulcanization for 10 to 30 minutes at 150 to 160° C. under a pressure of 100 bar.

The rubber-to-metal bonds were quality-assessed by standard methods for dry adhesion and resistance to boiling water. Metal test specimens measuring 25×60×1.5 mm bonded over an area of 25×25 mm according to ASTM 429B were used for the dry adhesion test. The elastomer strip is separated from the metal plate over half the length of the bond at a rate of 50 mm/min. The separating force based on the width of the test specimen is calculated from the maximum force in decanewtons/inch which occurs in this peeling process.

To test the corrosion resistance of the rubber-to-metal bond, the ASTM test specimens were subjected to a boiling water test. This test is described in detail in the above-cited article by Beiersdorf and Scheer. The test substrates are laterally roughened and scored with a stylus down to the metal at the bond seam. They are then stored in water at 95 to 98° C. for 2 hours under a tensile load of 2 kg applied perpendicularly to the bond seam. The rubber-to-metal bond is then broken and the fracture pattern evaluated. The corrosion resistance of the bond is judged to be better, the higher the percentage fracture occurring in the elastomer. Ideally, 100% fracture is observed in the elastomer.

Rubber-to-metal bonds where the chemical pretreatment was replaced by standard blasting (for steel: blasting with white cast-iron shot, for aluminum: blasting with corundum; in either case until a uniformly bright surface was obtained) were produced and tested for comparison.

Table 1 contains examples of the composition of pretreatment baths for the pretreatment according to the invention. All baths were adjusted to pH 4.5. Table 2 contains particulars of the process sequence and the test results.

To test storability, the test specimens were stored in air for 8 days after blasting or after the chemical pretreatment before the rubber-to-metal bond was produced. The results of the tests carried out with these test specimens are set out in Table 3.

TABLE 1

Bath Compositions

| Bath No. | | $PO_4^{3-}$ g/l | $NO_3-$ mg/l | $F^-$ (Free) mg/l | $F^-$ (Complex)*) mg/l | Na Molybdate, mg/l | Surfactant[1] (g/l) |
|---|---|---|---|---|---|---|---|
| Comp. | 101 | 5 | 58 | — | — | — | a,1 |
| | 102 | 5 | 58 | — | 380 | — | a,1 |
| | 103 | 5 | 58 | — | 380 | 80 | a,1 |
| | 104 | 10 | 60 | 200 | — | 80 | a,1 |
| | 105 | 5 | 58 | — | 380 | 80 | — |
| Comp. | 201 | 14 | 580 | — | — | — | b,1 |
| | 202 | 14 | 580 | — | 400 | — | b,1 |
| | 203 | 14 | 580 | — | 400 | 160 | b,1 |
| | 204 | 14 | 580 | — | 400 | 160 | — |
| | 205 | 14 | 580 | — | 800 | 160 | b,1 |

[1])Surfactants:
a) $C_{10-12}$ fatty alcohol × 6 EO × 8 PO and $C_{12-14}$ fatty alcohol × 5 EO × 4 PO in a ratio by weight of 1.5:1
b) fatty alcohol ethoxylate/propoxylate, end-capped (Lutensol ® LF 431, BASF AG) $C_{12-18}$ fatty alcohol × 9.1 EO - butyl ether, $C_{12-15}$ fatty alcohol × 8 EO in a ratio by weight of 3:1:1
*) as $K_2TiF_6$ 1) Surfactants:

a) $C_{10-12}$ fatty alcohol×6 EO×8 PO and $C_{12-14}$ fatty alcohol×5 EO×4 PO in a ratio by weight of 1.5:1 b) fatty alcohol ethoxylate/propoxylate, end-capped (Lutensol® LF 431, BASF AG) $C_{12-18}$ fatty alcohol× 9.1 EO—butyl ether, $C_{12-15}$ fatty alcohol×8 EO in a ratio by weight of 3:1:1

*) as $K_2TiF_6$

TABLE 2

Test Results

| Bath Application No. | Temp./Time | After-rinse[1] | Substrate[2] | Elastomer 1[3] D.H.[4] | Elastomer 1 BWT[5] | Elastomer 2 D.H. | Elastomer 2 BWT | Elastomer 3 D.H. | Elastomer 3 BWT |
|---|---|---|---|---|---|---|---|---|---|
| Comp. 1 | Blasted | — | St | 40 | 100 | 63 | 100 | 40 | 100 |
| Comp. 2 | " | — | Al | 38 | 100 | 65 | 100 | 42 | 100 |
| Comp. 3 | Comp. 101 Spraying 40° C./2 mins. | — | Al | | | 35 | 50 | 38 | 90 |
| Comp. 4 | Comp. 101 Spraying 40° C./2 mins. | a | Al | | | 50 | 90 | 45 | 95 |
| Comp. 5 | Comp. 201 Immersion 50° C./4 mins | — | Al | | | 56 | 90 | 45 | 100 |
| Comp. 6 | Comp. 201 Immersion 50° C./4 mins | a | Al | | | 60 | 95 | 48 | 100 |
| Example 1 | 102 Spraying 40° C./2 mins. | — | Al | 34 | 90 | 39 | 80 | 35 | 95 |
| Example 2 | 102 Spraying 40° C./2 mins. | — | St | 31 | 95 | 60 | 90 | 40 | 95 |
| Example 3 | 103 Spraying 40° C./2 mins. | — | Al | 36 | 100 | 41 | 100 | 37 | 100 |
| Example 4 | 103 Spraying 40° C./2 mins. | — | St | 33 | 95 | 67 | 95 | 45 | 100 |
| Example 5 | 103 Spraying 40° C./2 mins. | — | EG | | | 39 | 55 | | |
| Example 6 | 103 Spraying 40° C./2 mins. | b | EG | | | 52 | 95 | | |
| Example 7 | 103 Spraying | c | EG | | | 55 | 95 | | |

TABLE 2-continued

Test Results

| No. | Bath Application Temp./Time | After-rinse[1] | Substrate[2] | Elastomer 1[3] D.H.[4] | Elastomer 1[3] BWT[5] | Elastomer 2 D.H. | Elastomer 2 BWT | Elastomer 3 D.H. | Elastomer 3 BWT |
|---|---|---|---|---|---|---|---|---|---|
| Example 8 | 104 Spraying 40° C./2 mins. | — | Al | 35 | 100 | 62 | 95 | 46 | 100 |
| Example 9 | 105 Spraying 40° C./2 mins. | — | Al | 33 | 100 | 60 | 95 | 45 | 95 |
| Example 10 | 202 Immersion 50° C./4 mins. | — | Al | 45 | 90 | 54 | 80 | 40 | 95 |
| Example 11 | 202 Immersion 50° C./4 mins. | — | St | 30 | 90 | 65 | 80 | 38 | 90 |
| Example 12 | 203 Immersion 50° C./4 mins. | — | Al | 48 | 95 | 56 | 85 | 44 | 100 |
| Example 13 | 203 Immersion 50° C./4 mins. | a | Al | 47 | 100 | 56 | 95 | 45 | 100 |
| Example 14 | 203 Immersion 50° C./4 mins. | b | Al | 48 | 100 | 55 | 100 | 43 | 100 |
| Example 15 | 203 Immersion 50° C./4 mins. | c | Al | 49 | 100 | 55 | 100 | 44 | 100 |
| Example 16 | 203 Immersion 50° C./4 mins. | — | St | 31 | 95 | 67 | 85 | 40 | 95 |
| Example 17 | 204 Immersion 50° C./4 mins. | — | Al | 45 | 90 | 53 | 85 | 44 | 95 |
| Example 18*) | 205 Immersion 50° C./4 mins. | a | Al | | | 58 | 100 | | |

[1]a) Cr (III)/Cr (VI)-containing after-rinse: Deoxylyte ® 41, Henkel, KGaA, 0.1% by volume solution, immersion for 1 minute at 45° C.
b) Cr-free after-rinse solution based on zirconium fluoride: Deoxylyte ® 54 NC, Henkel KGaA 0.25% by volume solution, immersion for 1 minute at 50° C.
c) Cr-free organic reactive after-rinse solution based on polyvinylphenol: Deoxylyte ® 80 A, Henkel KGaA 1% by volume solution, immersion for 1 minute at 50° C.
[2]St: Steel ST37
EG: Electrolytically galvanized steel
Al: Al alloy AlMgSi1F32
[3]Elastomer types: cf. Text
[4]D.H.: Dry adhesion in decanewtons per inch (=2.54 cm)
[5]BWT: Boiling water test (cf. Text): % fracture in elastomer
*)Al content of the treatment bath: 5 ppm

TABLE 3

Test results for bonds produced after storage for 8 days following the pretreatment (for explanations, see Table 2)

| No. | Bath Application Temp./Time | After-rinse[1] | Substrate[2] | Elastomer 1[3] D.H.[4] | Elastomer 1[3] BWT[5] | Elastomer 2 D.H. | Elastomer 2 BWT | Elastomer 3 D.H. | Elastomer 3 BWT |
|---|---|---|---|---|---|---|---|---|---|
| Comp. 7 | Blasted | — | St | 30 | 75 | 45 | 80 | 25 | 80 |
| Comp. 8 | " | — | Al | 28 | 80 | 48 | 85 | 27 | 80 |
| Example 19 | 103 Spraying 40° C., 2 mins. | — | St | 33 | 95 | 65 | 95 | 42 | 95 |
| Example 20 | 103 Spraying 40° C., 2 mins. | — | Al | 35 | 100 | 40 | 95 | 35 | 95 |
| Example 21 | 203 Immersion 50° C., 4 mins. | — | St | 30 | 90 | 63 | 95 | 45 | 100 |

TABLE 3-continued

Test results for bonds produced after storage for 8 days following the pretreatment
(for explanations, see Table 2)

| No. | Bath Application Temp./Time | After-rinse[1] | Substrate[2] | Elastomer 1[3] D.H.[4] | Elastomer 1[3] BWT[5] | Elastomer 2 D.H. | Elastomer 2 BWT | Elastomer 3 D.H. | Elastomer 3 BWT |
|---|---|---|---|---|---|---|---|---|---|
| Example 22 | 203 Immersion 50° C., 4 mins. | — | Al | 35 | 100 | 38 | 100 | 40 | 100 |

[1]a) Cr (III)/Cr (VI)-containing after-rinse: Deoxylyte ® 41, Henkel, KGaA, 0.1% by volume solution, immersion for 1 minute at 45° C.
b) Cr-free after-rinse solution based on zirconium fluoride: Deoxylyte ® 54 NC, Henkel KGaA 0.25% by volume solution, immersion for 1 minute at 50° C.
c) Cr-free organic reactive after-rinse solution based on polyvinylphenol: Deoxylyte ® 80 A, Henkel KGaA 1% by volume solution, immersion for 1 minute at 50° C.
[2]St: Steel ST37
EG: Electrolytically galvanized steel
Al: Al alloy AlMgSi1F32
[3]Elastomer types: cf. Text
[4]D.H.: Dry adhesion in decanewtons per inch (=2.54 cm)
[5]BWT: Boiling water test (cf. Text): % fracture in elastomer

What is claimed is:

1. A process for the production of a rubber-to-metal bond comprising at least the following steps:
   a) treating one or more metal parts with an aqueous solution with a pH value of 3.5 to 5.5 which consists essentially of:
      (i) 4 to 20 g/l of phosphate ions,
      (ii) 0.1 to 1 g/l of free or complexed fluoride, and
      (iii) 0.04 to 1 g/l of nitrate ions.
   b) after said treating, rinsing said one or more metal parts, and
   c) after said treating and said rinsing, vulcanizing on said one or more metal parts a member selected from the group consisting of natural and synthetic rubbers.

2. A process as claimed in claim 1 wherein said vulcanizing employs a member selected from the group consisting of primers and binders.

3. A process as claimed in claim 1 wherein aqueous solution is further comprised of 0.05 to 0.5 g/l of molybdate ions.

4. A process as claimed in claim 1 wherein aqueous solution is further comprised of 0.5 to 2 g/l of one or more nonionic surfactants.

5. A process as claimed in claim 1 wherein said treating is carried out by immersing said one or more metal parts in said aqueous solution.

6. A process as claimed in claim 5 wherein said immersing is for a period of 2 to 8 minutes.

7. A process as claimed in claim 5 wherein said aqueous solution has a temperature of 40 to 60° C.

8. A process as claimed in claim 1 wherein said treating is carried out by spraying said one or more metal parts with said aqueous solution.

9. A process as claimed in claim 8 wherein said spraying is for a period of 1 to 3 minutes.

10. A process as claimed in claim 8 wherein said aqueous solution has a temperature of 30 to 50° C.

11. A process as claimed in claim 1 wherein said metal parts are comprised of a metal selected from the group consisting of steel, galvanized steel, aluminum, and magnesium.

12. A process for the production of a rubber-to-metal bond comprising at least the following steps:
   a) treating one or more metal parts comprised of a metal selected from the group consisting of steel, galvanized steel, aluminum, and magnesium with an aqueous solution with a pH value of 3.5 to 5.5 which consists essentially of:
      (i) 4 to 20 g/l of phosphate ions,
      (ii) 0.1 to 1 g/l of free or complexed fluoride and
      (iii) 0.04 to 1 g/l of nitrate ions,
      (iv) 0.05 to 0.5 g/l of molybdate ions, and
      (v) 0.5 to 2 g/l of one or more nonionic surfactants.
   b) after said treating, rinsing said one or more metal parts, and
   c) after said treating and said rinsing, vulcanizing on said one or more metal parts a member selected from the group consisting of natural and synthetic rubbers, wherein said vulcanizing employs a member selected from the group consisting of primers and binders.

13. In a method of bonding a rubber to a metal, the improvement comprising pretreating the metal with an aqueous solution with a pH value of 3.5 to 5.5 which consists essentially of:
   (i) 4 to 20 g/l of phosphate ions,
   (ii) 0.1 to 1 g/l of free or complexes fluoride, and
   (iii) 0.04 to 1 g/l of nitrate ions.

14. A process as claimed in claim 13 wherein said metal is selected from the group consisting of steel, galvanized steel, aluminum and magnesium.

15. A process as claimed in claim 13 wherein said aqueous solution is applied by immersing the metal parts in said aqueous solution.

16. A process as claimed in claim 15 wherein said immersing is for a period of 2 to 8 minutes.

17. A process as claimed in claim 15 wherein said aqueous solution has a temperature of 40 to 60° C.

18. A process as claimed in claim 13 wherein said treating is carried out by spraying said one or more metal parts with said aqueous solution.

19. A process as claimed in claim 18 wherein said spraying is for a period of 1 to 3 minutes.

20. A process as claimed in claim 18 wherein said aqueous solution has a temperature of 30 to 50° C.

21. A process as claimed in claim 13 wherein aqueous solution is further comprised of 0.05 to 0.5 g/l of molybdate ions.

22. A process as claimed in claim 13 wherein aqueous solution is further comprised of 0.5 to 2 g/l of one or more nonionic surfactants.

* * * * *

UNITED STATES PATENT AND TRADEMARK OFFICE
CERTIFICATE OF CORRECTION

PATENT NO. : 6,440,231 B1
DATED : August 27, 2002
INVENTOR(S) : Beiersdorf et al.

It is certified that error appears in the above-identified patent and that said Letters Patent is hereby corrected as shown below:

<u>Title page,</u>
Item [57], ABSTRACT,
Line 3, after "vided" and before "The" insert therefor -- . --.

<u>Column 10,</u>
Line 27, after "fluoride" insert therefore -- , --.
Line 42, delete "complexes" and insert therefor -- complexed --.

Signed and Sealed this

Twenty-ninth Day of April, 2003

JAMES E. ROGAN
*Director of the United States Patent and Trademark Office*